Figure 1:
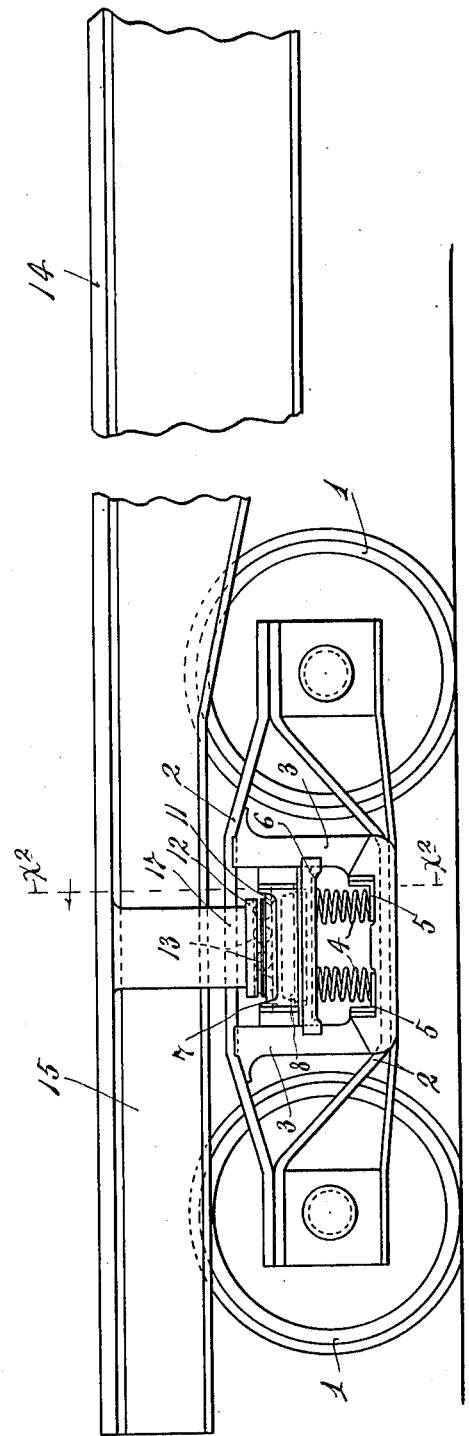

J. C. BARBER.
CAR CONSTRUCTION.
APPLICATION FILED APR. 6, 1911.

1,031,163.

Patented July 2, 1912.

3 SHEETS—SHEET 1.

Witnesses
A. H. Opsahl.
Harry L. Opsahl.

Inventor
John C. Barber
By his Attorneys
Williamson Merchant

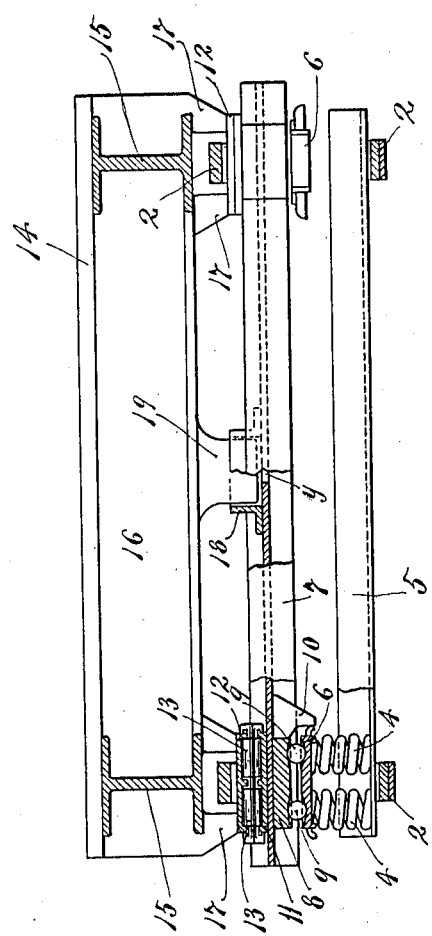

J. C. BARBER.
CAR CONSTRUCTION.
APPLICATION FILED APR. 6, 1911.
1,031,163.
Patented July 2, 1912.
3 SHEETS—SHEET 3.
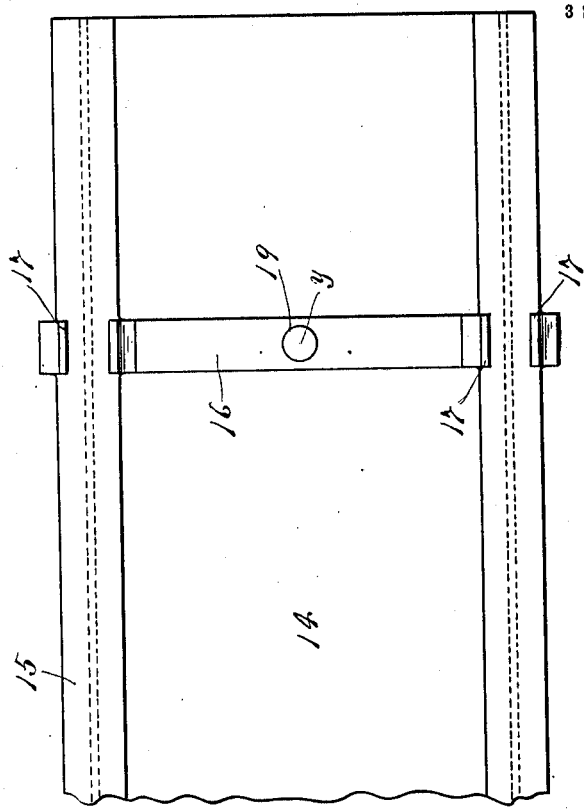
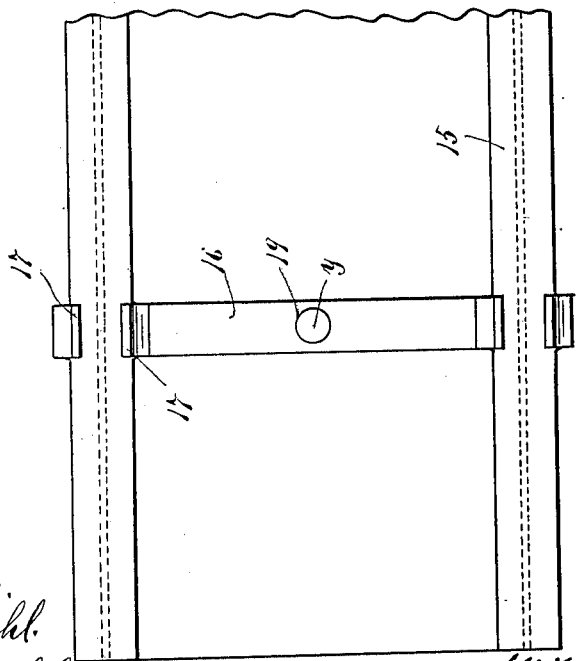
Witnesses
A. H. Opsahl.
H. L. Opsahl.
Inventor
John C. Barber
By his Attorneys
Williamson Merchant

UNITED STATES PATENT OFFICE.

JOHN C. BARBER, OF CHICAGO, ILLINOIS, ASSIGNOR TO STANDARD CAR TRUCK COMPANY, OF CHICAGO, ILLINOIS, A CORPORATION OF NEW JERSEY.

CAR CONSTRUCTION.

1,031,163. Specification of Letters Patent. Patented July 2, 1912.

Application filed April 6, 1911. Serial No. 619,216.

*To all whom it may concern:*

Be it known that I, JOHN C. BARBER, a citizen of the United States, residing at Chicago, in the county of Cook and State of Illinois, have invented certain new and useful Improvements in Improved Car Construction; and I do hereby declare the following to be a full, clear, and exact description of the invention, such as will enable others skilled in the art to which it appertains to make and use the same.

My invention has for its general object to improve the construction of railway cars, but is more particularly directed to the improvement of freight cars of the so-called flat car and box car types.

The invention consists of the novel devices and combinations of devices hereinafter described and defined in the claims.

The whole trend of railway development for many years has been, and at the present time is in the direction of increasing capacity, and this development is most marked in the enormously high carrying capacity now demanded in freight cars. Not many years ago a freight car having a carrying capacity of from fifty to seventy five thousand pounds was considered large, but at the present time there is a demand for freight cars having a carrying capacity of one hundred and fifty thousand pounds. To meet this increasing demand as to capacity of the cars, various minor or even important inventions have hitherto been made, especially in the provision of certain lateral motion devices for permitting transverse motion of the car body in respect to the wheels, and in many other respects, but the same type of car construction has generally been followed, to-wit, the trucks have been provided with truck bolsters and the car bodies with body bolsters, and the weight of the car body and its load have been transmitted to the trucks through two main bearings located at the central portions of the said bolsters and in the vicinity of the pivotal connections between the trucks and the car body. This was found to be good construction until the cars were constructed for approximately the above noted high carrying capacity. In these high carrying capacity cars, the load has been found too great to be properly transmitted through two center bearings, and also too great for transmission through bolsters of practical dimensions designed to act as a lever or truss, or in other words, which are supported at their ends and carry their load at the center, or conversely, and hence, were subject to enormous bending stresses.

In the prior patent to Lake and Deverell, 798,350, of date, August 29th, 1905, and entitled "anti-friction bearing for railway cars," and in my own prior Patent, 875,565, of date, December 31, 1907, entitled "car truck," and in several of my subsequent patents, the problem of constructing freight cars of high carrying capacity is, in part, solved by the use of lateral motion side bearings in lieu of center bearings located at four different points, to-wit, one over each side frame of each car truck. In all of these noted patents, however, the weight of the load was transmitted to the lateral motion side bearings through body bolsters which had to act as levers or trusses, and which, in accordance with the hitherto prevailing practice, were connected to center sills or to sills located laterally remote from the said bearings.

In my present invention I overcome the various weaknesses or objectionable features in the construction of freight cars of high carrying capacity, by providing the car body with side sills located directly over the side frames of the car trucks and I interpose the lateral motion side bearings directly between the truck side frames and the overlying side sills so that the weight of the load is transmitted from the car body downward directly from the side sills to the said truck side frames. By this improved arrangement, the weight of the load is not only distributed to four different points but is transmitted from four points of the car body to four points on the two trucks. Hence, with this construction, the truck bolsters and the body bolsters are so very greatly relieved from the function of carrying the load and bending stresses, that they become secondary, or subordinate elements and are required to be only strong enough to give proper rigidity, in case of the body bolster, to the car body or platform structure, and in case of the truck bolster, to properly space certain elements of the side bearings and to coöperate with the body bolsters to afford the proper pivotal connections between the trucks and the car bodies.

One form of my present invention is illustrated in the accompanying drawings wherein like characters indicate like parts throughout the several views.

Referring to the drawings, Figure 1 is a view in side elevation with some parts broken away and some parts removed showing a flat car embodying my invention; Fig. 2 is a transverse section taken approximately on the line $x^2$ $x^2$ of Fig. 1, some parts being removed and some parts being shown in full; and Fig. 3 is a bottom plan view of the platform structure of the car showing the relative arrangement of the side sills and the four point bearings.

To illustrate the broad underlying principles involved in the present invention, I have in the accompanying drawings illustrated a very simple form of car structure which it will, of course, be understood, may be very greatly modified without departing from the spirit of the invention.

Referring to the drawings, the numeral 1 indicates the wheels and the numeral 2 the side frames of the car truck. The said side frames 2, as shown, are provided with U-shaped column castings 3, the lower horizontal portions of which afford supports for bolster springs 4. The lower portions of the column castings 3 are connected by transoms 5, preferably in the form of angle bars. The bolster springs 4 support combined spring caps and roller bases 6 that are guided for vertical movements but held against horizontal movements by the bolster columns.

The truck bolster 7, which is preferably in the form of a commercial steel I-beam, is shown as provided on the under sides of its end portions with rigidly secured roller caps 8. Bearing rollers 9 are interposed between the roller caps 8 and the underlying combined spring caps and roller bases 6 and the said elements 8 and 6 are provided with concave roller seats, which, under weight of the load, tend to hold the said rollers and the truck bolster in intermediate positions. Extreme endwise movements of the bolster 7 are, as shown, limited by stop lugs 10 on the roller caps 8 which are engageable with the inner edges of the combined spring caps and roller bases 6.

Obviously, the above noted elements 6, 8 and 9 constitute lateral motion bearings for permitting endwise movements of the truck bolster and of the car body in respect to the trucks. Rigidly secured to the ends of the truck bolster 7 immediately over the roller caps 8 are roller bases 11 between which, and overlying roller caps 12, bearing rollers 13 are interposed. These elements 11, 12 and 13 constitute the side bearings for permitting pivotal or radial movements of the trucks in respect to the car body. It is probably evident but may be here stated that the lateral motion rollers 9 have their axes extended at a right angle to the truck bolster 7, while the side bearing rollers 13 have their axes extended approximately parallel to the said truck bolster or, if desired, radially from the central point $y$ of said bolster. The car platform or body 14, in lieu of the customary center sills, is provided with side sills 15 rigidly secured thereto and extended from end to end thereof. These side sills 15, in cross section, are preferably in the form of I-beams, the end portions of which have parallel upper and lower flanges and the intermediate portions of which are increased in depth to form the proper truss for carrying the load at the intermediate or central portion of the car. These side sills may be constructed in various different ways. They are shown as if cast integral with the body bolster 16 with the said body bolster located in the same horizontal plane as the end portions of the said sills; and depending, laterally spaced bearing legs 17 which embrace the top arch bars of the truck side frame, and are seated upon roller caps 12 of the side bearings, are shown as cast integral with the said side sills and body bolsters. This affords a simple illustration of the principles involved in the present invention, but, in practice, the said elements 15, 16 and 17 will usually be individually or separately formed and rigidly connected by bolts, rivets, or other well known means. The bearing legs 17 are spaced to afford sufficient clearance between the same and the top arch bar to permit the desired lateral motion of the car body in respect to the truck side frames. Also, it will be understood that it is not necessary that the body bolsters 16 be confined to the planes of the ends of the side sills, but that they might be overlapped therewith, but in any event, the weight of the load would be transmitted directly downward from the side sills to the roller bearing or similar devices, and from thence, to the side frames of the car trucks, and the body bolsters and truck bolsters, in so far as they serve to transmit the weight of the load from the side sills to the truck frames, and would simply act under direct compression or as direct interposed elements. It may be here further stated, that in my co-pending application filed of date April the 15th, 1911, under Serial Number 621,239, entitled "Underframe structure for cars" and in my U. S. Patent Number 1,014,362, issued of date Jan. the 9th, 1912, entitled "Car trucks", I have disclosed a commercial form and arrangement of the lateral motion side bearings of the side sills and of the body and truck bolsters.

To afford a simple and efficient pivotal connection between the truck bolsters 7 and overlying body bolsters 16, the former is shown as provided with a rigidly secured annular socket 18, and the latter is provided with a depending centrally located hub 19. The hub 19 is telescoped into the socket 18, and the axes thereof, are coincident with the central point $y$ of the truck bolster. The pivotal connections afforded by the elements 18 and 19 cause the truck bolsters 7 to travel with the body bolster 16 and car body, in a direction transversely of the car by permitting the truck bolsters to move pivotally or radially with the respective car trucks and in respect to the said body bolsters and car body.

From what has already been said, it is evident, that the weight of the car body and of its load are initially carried directly by the side sills 15, and that this weight or load is transmitted directly downward from the said side sills through the bearing legs 17 to the underlying side bearings, from thence, through the interposed ends of the truck bolsters to the lateral motion bearings and from thence through the bolster springs 4 to the truck side frames. This, as is also evident, is accomplished without transmitting the force of the load, with a leverage action, through the body and truck bolsters. For instance, any such bending force applied to the body bolsters, is not directly incident to the transmission of the load from the car body to the truck side frames, but is due to the function that they exert in holding the car body or platform rigid or in proper form. Otherwise stated, the truck bolsters and body bolsters might be dispensed with in case other means may be employed for giving proper rigidity to the platform structure of the car and for affording the proper pivotal connection between the trucks and car body.

What I claim is:

1. The combination with car trucks having side frames, of a car body having side sills extending longitudinally thereof, from one truck to the other, and located directly over the corresponding side frames of said trucks, and bearing devices, carrying the entire weight of the load, interposed between said sills and truck side frames and permitting movements of said car body in respect to said trucks.

2. The combination with a car truck having side frames, of a car body having side sills extending longitudinally thereof, from one truck to the other and located directly over the corresponding side frames of said trucks, said trucks having central pivotal connections to said car body, the said pivotal connections being free from the load, and bearing devices carrying the entire weight of the load directly interposed between said side sills and truck frames and permitting movements of the car body in respect to said trucks.

3. The combination with a car truck having side frames, of a car body having side sills extending longitudinally thereof, from one truck to the other and located directly over the corresponding side frames of said trucks, said trucks having central pivotal connections to said car body, the said pivotal connections being free from the load, and bearing devices carrying the entire weight of the load directly interposed between said side sills and truck frames and permitting both lateral and radial movements of said trucks in respect to said car body.

4. The combination with a car truck having side frames, of a car body having side sills extending longitudinally thereof, from one truck to the other and located directly over the corresponding side frames of said trucks, said trucks having central pivotal connections to said car body, the said pivotal connections being free from the load, and bearing devices carrying the entire weight of the load directly interposed between said side sills and truck frames and permitting both lateral and radial movements of said trucks in respect to said car body, and also permitting vertical movements of said car body in respect to the truck side frames.

5. The combination with car trucks having side frames, of a car body having side sills extending longitudinally thereof, from one truck to the other, and located directly over the corresponding side frames of said trucks, and lateral motion bearing devices interposed between said side sills and the corresponding underlying truck side frame.

6. The combination with car trucks having side frames, of a car body having side sills extending longitudinally thereof, from one truck to the other, and located directly over the corresponding side frames of said trucks, and combined lateral and radial motion side bearings interposed between said side sills and the corresponding underlying truck side frames.

7. The combination with car trucks having side frames, of a car body having side sills extending from one truck to the other and directly overlying the corresponding truck side frames, of truck bolsters seated in the laterally spaced truck side frames and centrally pivoted to the car body structure, and bearing devices interposed between the said side sills and the ends of said bolsters, in vertical lines with said side frame, said bearing devices permitting movements of said truck frames in respect to said car body.

8. The combination with car trucks having side frames, of a car body having side sills extending from one truck to the other, and having body bolsters connecting the said side sills over said trucks, of truck bolsters centrally pivoted to the corresponding body bolsters, but free from the weight of the load, springs and lateral motion devices supporting said truck bolsters from the corresponding side frames, and radial motion side bearings interposed between said sills and the ends of said truck bolsters, in vertical alinement with said side frames.

9. The combination with car trucks having side frames, of a car body having side sills located over said side frames, a truck bolster extended through said side frames, and lateral motion side bearings applied to the ends of said bolster, the said lateral motion side bearings and the ends of said bolster being interposed directly between the said side sills and side frames and serving to directly support the former from the latter.

In testimony whereof I affix my signature in presence of two witnesses.

JOHN C. BARBER.

Witnesses:
A. M. LOVE,
LEE W. BARBER.

Copies of this patent may be obtained for five cents each, by addressing the "Commissioner of Patents, Washington, D. C."